A. L. AUSTIN.
MOTOR VEHICLE SIGNAL.
APPLICATION FILED JAN. 22, 1920.

1,426,448.

Patented Aug. 22, 1922.
2 SHEETS—SHEET 1.

Inventor
A. L. Austin

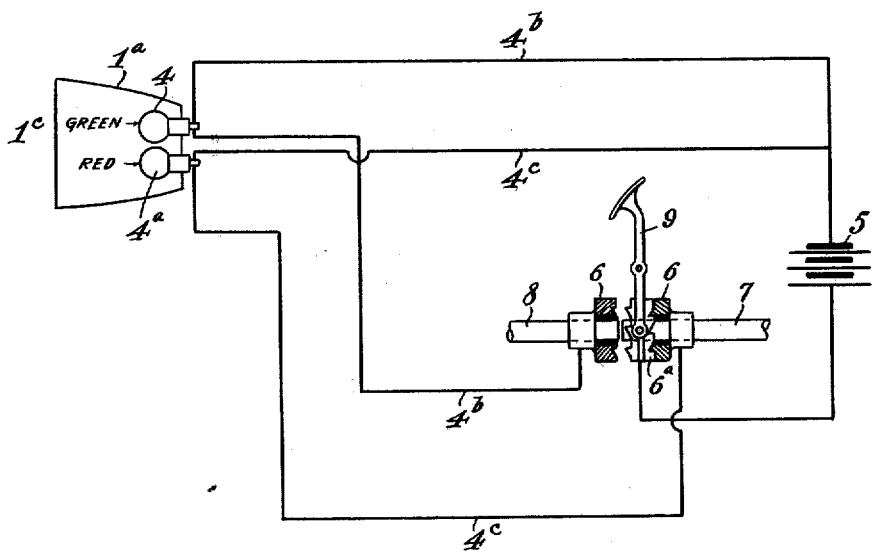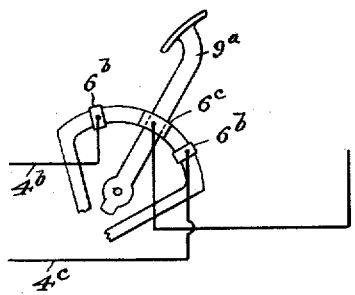

UNITED STATES PATENT OFFICE.

ALBERT L. AUSTIN, OF CLEVELAND, OHIO, ASSIGNOR TO VICTOR GRANDE AND ANTHONY J. FERRIS, BOTH OF NEW YORK, N. Y.

MOTOR-VEHICLE SIGNAL.

1,426,448.  Specification of Letters Patent.  Patented Aug. 22, 1922.

Application filed January 22, 1920. Serial No. 353,288.

*To all whom it may concern:*

Be it known that I, ALBERT L. AUSTIN, a citizen of the United States, residing at Cleveland, in the county of Cuyahoga and State of Ohio, have invented certain new and useful Improvements in Motor-Vehicle Signals, of which the following is a specification.

My invention relates to improvements in motor vehicle signals, and more particularly to that class or type which are adapted to indicate the motion or direction which the motor vehicle is about to assume, as for example,—a stop or a turn to the right or left.

The invention further relates to an improved license panel carrying and illuminating signal lamp whereby the numerals or characters of the license panel are so positively and clearly illuminated at all times as to be distinctly visible and readable at a distance at night and as contradistinguished from the manner of illuminating such panels as now commonly employed.

The invention further relates to improved means for carrying and illuminating the license sign or panel in connection with the signal or tail lamp.

The primary object of the invention is to provide a generally improved motor vehicle signal which will be exceedingly simple in construction, cheap of manufacture, and efficient in use.

A further and very important object is to provide a signal of this class which will be operated and controlled through the medium of the vehicle control and steering mechanism so that the signal lamps will be energized and deenergized in accordance with the movements of the vehicle.

With the above mentioned and other objects in view, the invention consists in the novel construction, arrangement, and combination of parts, hereinafter described, illustrated in one of its embodiments in the accompanying drawings, and particularly pointed out in the appended claims.

Figure 1:
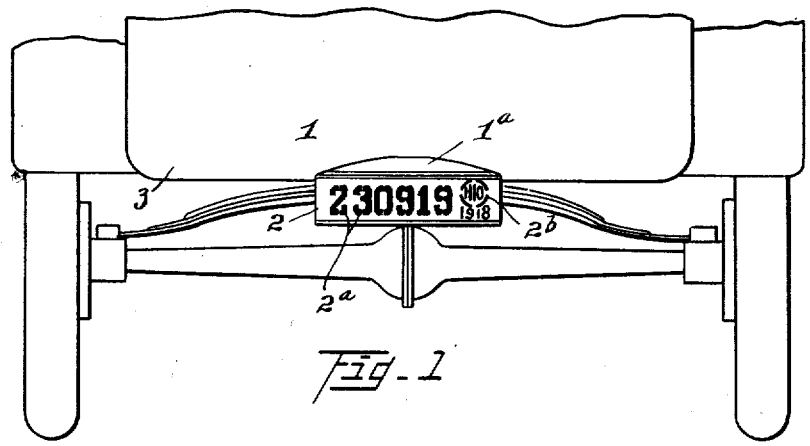

Referring to the drawings, forming a part of this specification, Figure 1 is a view of a license panel carrying and illuminating signal lamp constructed in accordance with this invention and applied to the rear of a motor vehicle for use as a tail lamp.

Figure 2:
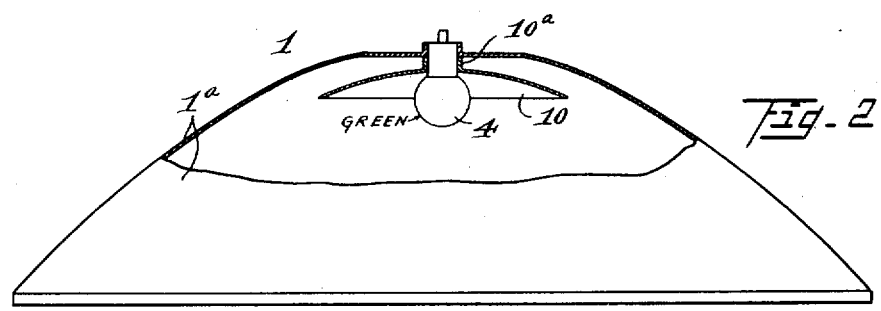

Fig. 2 an enlarged top plan view of the signal lamp, detached, a portion of the lamp casing walls being broken away for the purpose of clearer illustration of the internal parts.

Figure 3:
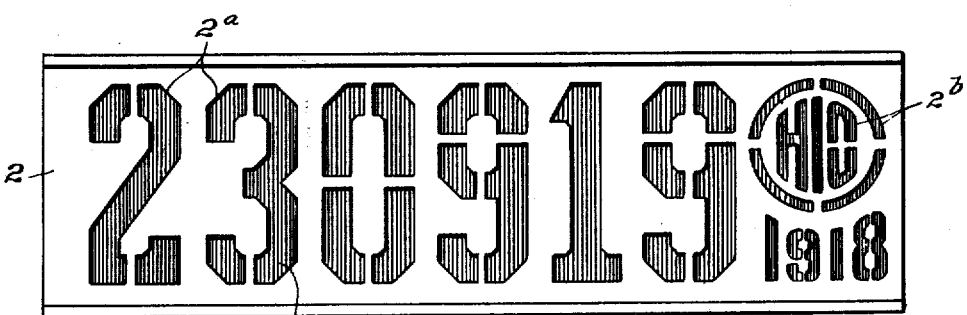

Fig. 3 a rear view of the same.

Figure 4:
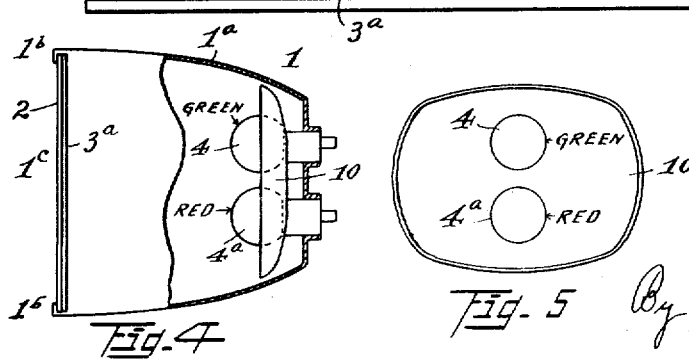

Fig. 4 a side elevation of the same, a portion of the casing being broken away to illustrate the inner or supplementary reflector and the arrangement of the lamp bulbs or sources of illumination therein.

Figure 5:
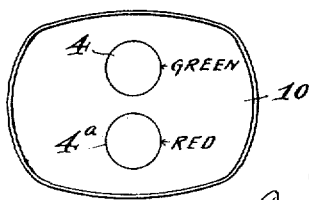

Fig. 5 a rear view of the inner or supplementary reflector and lamp bulbs.

Fig. 6 a diagrammatic view of the wiring or lamp circuits and means for energizing and deenergizing the same in connection with suitable motor vehicle control mechanism.

Fig. 7, a modified construction of relatively fixed and movable contact elements for energizing and de-energizing the lamp circuits through suitable lever mechanism.

Similar numerals of reference designate like parts throughout all the figures of the drawings.

The improved signal comprises a lamp casing 1 of any suitable and convenient form, but preferably of general reflector form as shown with the walls 1ª diverging and terminating in spaced guideways 1ᵇ spaced apart, forming a transversely elongated open portion 1ᶜ, said guideways 1ᵇ being adapted to receive and carry a license panel 2. The license panel 2 is provided with suitable characters such for example as the license numerals 2ª and letters 2ᵇ or other characters forming the license number and other identifying insignia.

The lamp casing 1 is suitably attached to a suitable portion of the motor vehicle, as for example,—to the rear of the vehicle body 3, forming in such instance a tail lamp, such lamp also serving to carry and positively illuminate the characters of the license plate or panel 2.

The license plate or panel 2 may be provided with a transparent plate or backing 3ª at the rear, as indicated most clearly in Fig. 4 of the drawings. As a means of illuminating the open characters in the license plate or panel as well as providing sources of illumination or lamp bulbs of different colors to indicate the motion or direction which the motor vehicle is assuming or about to assume, the casing 1 is provided with lamp bulbs 4 and 4ª, such lamp bulbs, in the present instance, being of green and red, respectively.

As a means of controlling said sources of illumination through the movements of the motor vehicle the lamp bulbs 4 and 4ª are connected to suitable lamp circuits 4ᵇ and 4ᶜ, respectively, such circuits communicating with a suitable source of electric energy 5 and being connected to suitable contact elements 6 adapted to be opened and closed through a movable contact element 6ª, whereby the source of illumination or elements 4 and 4ª may be alternately energized and deenergized.

The lamp circuits 4ᵇ and 4ᶜ are connected to some suitable motor vehicle control mechanism, such for example as the contact element 6 on the motor shaft 7, and the contact element 6 on the shaft 8, leading to the transmission mechanism, the movable contact element 6ª in this instance being in the form of a clutch member, operated and controlled through a suitable clutch operating or shifting lever 9.

In view of the above construction and as illustrated diagrammatically in Fig. 6 of the drawings, it will be apparent that when the clutch lever 9 and connected parts are in the position shown, the lamp circuit 4ᶜ leading to the lamp bulb 4ª will be energized and a red light will be projected through the open characters of the license panel so that when the clutch is thrown out or when the motor is running without being in connection with the transmission mechanism a red light will be shown, and when the clutch is thrown in or in contact with the opposite contact element the circuit 4ᵇ will be energized, thereby projecting a green light through the open characters of the license panel. It will therefore be apparent that when the motor is in connection with the transmission mechanism a green light will be shown, and will be so shown until the clutch is again thrown out when the circuit leading to the green light will be deenergized, and the circuit leading to the red light will be energized.

In the modified form of lever mechanism shown in Fig. 7 of the drawings, the movable contact element, 6ᶜ, is carried by the lever, 9ª, and is adapted to make contact with the relatively fixed contact elements, 6ᵇ, mounted on the segment or bracket shown.

If desired, the lamp casing may be provided with a supplemental reflector 10 having tubular sockets 10ª to receive and contain the shank portions of the lamp bulbs 4 and 4ª as shown most clearly in Figs. 3, 4 and 5 of the drawings.

Having thus described one of the embodiments of my invention, without having attempted to set forth all the forms in which it may be made or all the modes of its use, what I claim and desire to secure by Letters Patent is:

1. In motor vehicle signaling means, including a panel provided with license indicating characters, means for normally illuminating said panel with light of one color to display the license and for changing the illumination to a light of another color to give a signal.

2. In motor vehicle signaling means including vehicle controlling mechanism, a panel provided with license indicating characters, means operated by said vehicle controlling mechanism for normally illuminating said panel with light of one color to display the license and for changing the illumination to a light of another color to give a signal.

3. In a motor vehicle, signaling means a lamp casing, including a light transmitting panel provided with license indicating characters, different colored lamps in said casing, a source of electrical energy and circuit connections for said lamp, a two position switching means for normally including one of said lamps in and excluding the other from said circuit connections in one position thereof and for including the second named lamp and excluding the first named lamp in the second position of the switch.

4. In a motor vehicle, signaling means, a lamp casing including a light transmitting panel provided with license indicating characters, different colored lamps in said casing, a source of electrical energy and circuit connections for said lamps, vehicle control mechanism, two position switching means operated by said vehicle control mechanism for normally including one of said lamps in and excluding the other from said circuit connections in one position thereof and for including the second named lamp and excluding the first named lamp in the second position of the switch.

5. In a motor vehicle, including vehicle control mechanism, a lamp casing, a source of illumination therein, a license panel provided with open numerals, and means for controlling said source of illumination and signaling through said open numerals through said vehicle control mechanism.

6. In a signal, a motor vehicle provided with a reflector casing, signal lights of different colors therein, a license number panel carried by said casing and illuminated by said signal lights, and means for selectively energizing and deenergizing said signal lights in accordance with predetermined movements of said motor vehicle.

7. In a signal, a motor vehicle provided with a projector casing, signal lights of different colors therein, a license panel carried by said casing and provided with open characters illuminated by said signal lights, and light circuits and vehicle control actuated contact elements for selectively energizing and deenergizing said signal lights in accordance with the movements with said vehicle control elements.

In testimony whereof I have affixed my signature.

ALBERT L. AUSTIN.